United States Patent
Soroushian

(10) Patent No.: US 7,970,056 B2
(45) Date of Patent: Jun. 28, 2011

(54) METHOD AND/OR APPARATUS FOR DECODING AN INTRA-ONLY MPEG-2 STREAM COMPOSED OF TWO SEPARATE FIELDS ENCODED AS A SPECIAL FRAME PICTURE

(75) Inventor: Kourosh Soroushian, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 1216 days.

(21) Appl. No.: 10/606,731

(22) Filed: Jun. 26, 2003

(65) Prior Publication Data
US 2004/0264578 A1   Dec. 30, 2004

(51) Int. Cl.
  H04N 7/12     (2006.01)
  H04N 11/02    (2006.01)
  H04N 11/04    (2006.01)
(52) U.S. Cl. ................... 375/240.12; 348/446
(58) Field of Classification Search ............. 375/240.12; 348/446
See application file for complete search history.

(56) References Cited

U.S. PATENT DOCUMENTS

| | | | | |
|---|---|---|---|---|
| 5,185,819 A * | 2/1993 | Ng et al. | | 382/234 |
| 5,461,420 A * | 10/1995 | Yonemitsu et al. | | 375/240.15 |
| 5,485,280 A * | 1/1996 | Fujinami et al. | | 386/123 |
| 5,579,052 A * | 11/1996 | Artieri | | 375/240.15 |
| 5,592,299 A * | 1/1997 | Boyce et al. | | 386/68 |
| 5,619,501 A | 4/1997 | Tamer et al. | | |
| 5,742,343 A * | 4/1998 | Haskell et al. | | 375/240.15 |
| 5,926,573 A * | 7/1999 | Kim et al. | | 382/239 |
| 6,091,772 A | 7/2000 | Anderson et al. | | |
| 6,222,589 B1 * | 4/2001 | Faroudja et al. | | 348/448 |
| 6,317,463 B1 | 11/2001 | Prozorov | | |
| 6,392,712 B1 * | 5/2002 | Gryskiewicz et al. | | 348/584 |
| 2002/0028061 A1 * | 3/2002 | Takeuchi et al. | | 386/68 |

OTHER PUBLICATIONS

"2D DCT and JPEG"; Jan. 11, 2008; Cal Poly Electrical Engineering Department; http://courseware.ee.calpoly.edu/~fdepiero/STL/STL%20-%20Image%20-%202D%20DCT%20and%20JPEG.htm.*

* cited by examiner

*Primary Examiner* — Marsha D Banks Harold
*Assistant Examiner* — Jeremaiah C Hallenbeck-Huber
(74) *Attorney, Agent, or Firm* — Christopher P. Maiorana, PC

(57) ABSTRACT

A method for decoding a bitstream comprising the steps of (A) generating a first field picture in response to a frame picture of a first bitstream, (B) generating a second field picture in response to the frame picture of the first bitstream and (C) generating a second bitstream containing the first field picture and the second field picture.

19 Claims, 6 Drawing Sheets

US 7,970,056 B2

METHOD AND/OR APPARATUS FOR DECODING AN INTRA-ONLY MPEG-2 STREAM COMPOSED OF TWO SEPARATE FIELDS ENCODED AS A SPECIAL FRAME PICTURE

FIELD OF THE INVENTION

The present invention relates to video compression generally and, more particularly, to a method and/or apparatus for decoding an intra-only MPEG-2 stream composed of two separate fields encoded as a special frame picture.

BACKGROUND OF THE INVENTION

Referring to FIG. 1, a portion of a typical video frame 10 is shown. The frame 10 includes alternating lines from two separate fields. The separate fields are generally referred to as even/odd, top/bottom, or field1/field2. The vertical resolution of each field is half that of the total video frame. When displayed n a NTSC standard television monitor, each field is shown for one-sixtieth of a second. Due to a characteristic of the human visual system known as persistence, the displayed fields appear to be consecutive and complete frames of motion video.

The frame 10 can be encoded using digital video compression for many applications. Transmission over limited bandwidth channels such as direct broadcast satellite (DBS) and storage on optical media (i.e., CD, DVD, etc.) are typical examples. In order to achieve efficient compression, complex, computationally intensive processes are used for encoding (or compressing) and decoding (or decompressing) digital video signals. Using conventional digital video compression, the frame 10 can be encoded via a standard such as MPEG-2.

The MPEG-2 compression standard operates on the basis of a variety of rules which eventually act to achieve a representation of the video sequence in a very optimized manner. The application of these specific rules and syntax to a video sequence creates a final stream of bits (i.e., a bitstream) that can be used to accurately replicate the pixels of the original frames of the source image.

MPEG-2 operates on a 16×16 pixel block basis. The 16×16 block is usually referred to as a macroblock. Macroblocks can have rows (or slices) representing interleaved field lines (e.g., the macroblocks 12 and 14). An MPEG-2 stream containing macroblocks with interleaved field lines is called a frame picture. Alternatively, the macroblocks can have rows representing information from a single field (e.g., the macroblocks 16 and 18). An MPEG-2 stream containing macroblocks with rows representing information from a single field is called a field picture. The MPEG-2 stream containing macroblocks with rows representing information from a single field occurs in the MPEG-2 syntax traditionally referred to as field picture mode. In the field picture mode, each field of the video frame 10 is encoded separately and converted into a bitstream. Support for field picture mode is mandatory according to the MPEG-2 decoder syntax.

During the encoding process, the video frame 10 can be coded in a fashion that complies with the syntax of the MPEG-2 video frame format, but actually transforms the source video frame to a different representation. One such transformation is when a video frame is comprised of alternating macroblock rows, with each row consisting of 16 vertical lines from each video field. Such a configuration may be advantageous for encoding and transmission of a particular set of video sequences. Additionally, the bitstream can be formed solely of intra-frame pictures. Although such a video frame format can be compressed, it is often desirable that the video sequence be decodable to the normal alternating even/odd field lines for presentation on a television monitor.

A solution for transforming an intra-only, frame picture encoded bitstream into a secondary format that can be decoded as interlaced field pictures by a standard, MPEG-2 compliant decoder would be desirable.

SUMMARY OF THE INVENTION

The present invention concerns a method for decoding a bitstream comprising the steps of (A) generating a first field picture in response to a frame picture of a first bitstream, (B) generating a second field picture in response to the frame picture of the first bitstream and (C) generating a second bitstream containing the first field picture and the second field picture.

The objects, features and advantages of the present invention include providing a method and/or apparatus for decoding an intra-only MPEG-2 stream composed of two separate fields encoded as a special frame picture that may (i) transform an intra-only, frame picture encoded bitstream into a secondary format and/or (ii) provide a bitstream format that can be decoded as interlaced field pictures by a standard, MPEG-2 compliant decoder.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
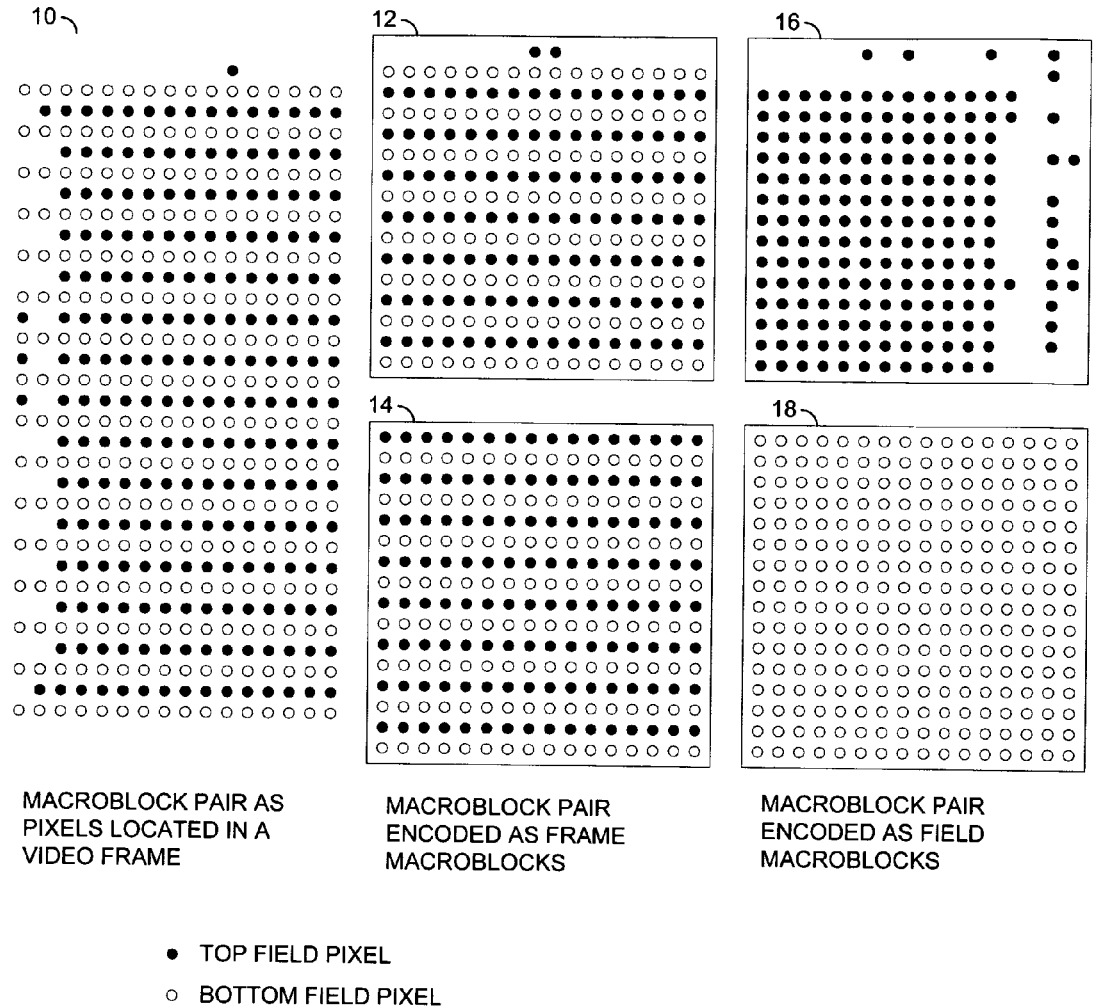
FIG. 1 is a diagram illustrating various encoding schemes for an interlaced video frame.
Figure 2:
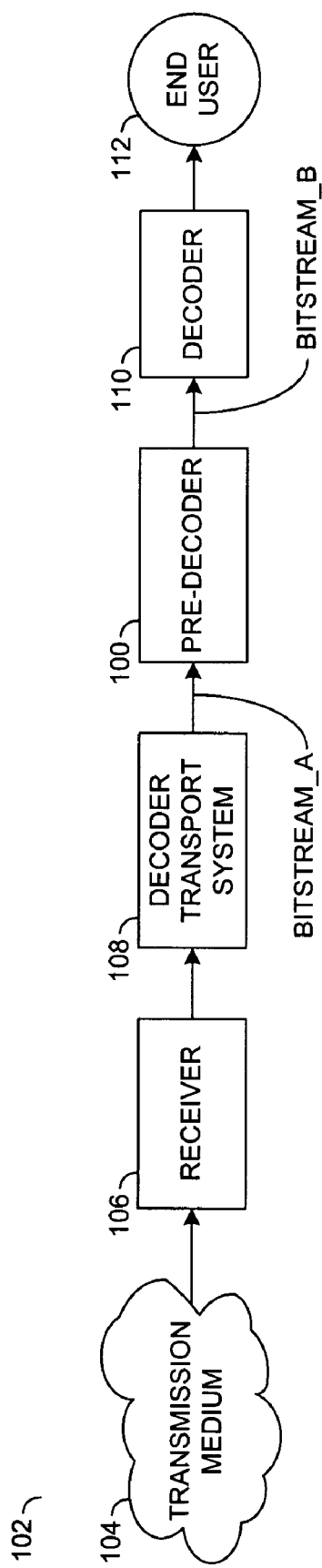
FIG. 2 is a block diagram illustrating a preferred embodiment of the present invention implemented in a receive path.

Referring to FIG. 2, a block diagram of a circuit 100 in accordance with a preferred embodiment of the present invention is shown. The circuit 100 may be implemented, in one example, as a pre-decoder circuit (or block). The circuit 100 may be implemented, in one example, in the context of a receive path 102 of a video transmission system. The circuit 100 may be configured to transform a first bitstream (e.g., BITSTREAM_A) into a second bitstream (e.g., BITSTREAM_B). The bitstream BITSTREAM_A is generally implemented as an MPEG-2 intra-only frame picture bitstream. The bitstream BITSTREAM_A generally comprises alternating macroblock-rows (or slices) containing video information from a single field. The output bitstream BITSTREAM_B generally comprises an intra-only MPEG-2 field picture bitstream.

The receive path 102 may comprise a transmission medium 104 through which a video bitstream may be transmitted. A receiver 106 may receive the bitstream from a transmission medium 104. The receiver 106 may transfer the bitstream to a decode transport system 108. The decode transport system 108 may present the signal BITSTREAM_A to an input of the circuit 100. An output of the circuit 100 may present the signal BITSTREAM_B to an input of a decoder 110. The decoder 110 may present a decoded video signal to an end user 112. In one example, the decoder 110 may be implemented as a standard MPEG-2 compliant decoder and the end user 112 may be implemented as a standard television monitor. In general, the transmission medium 104, the receiver 106, the decoder transport system 108, the decoder 110 and the end user 112 may be implemented using conventional techniques which are known to those of ordinary skill in the art.

Figure 3:
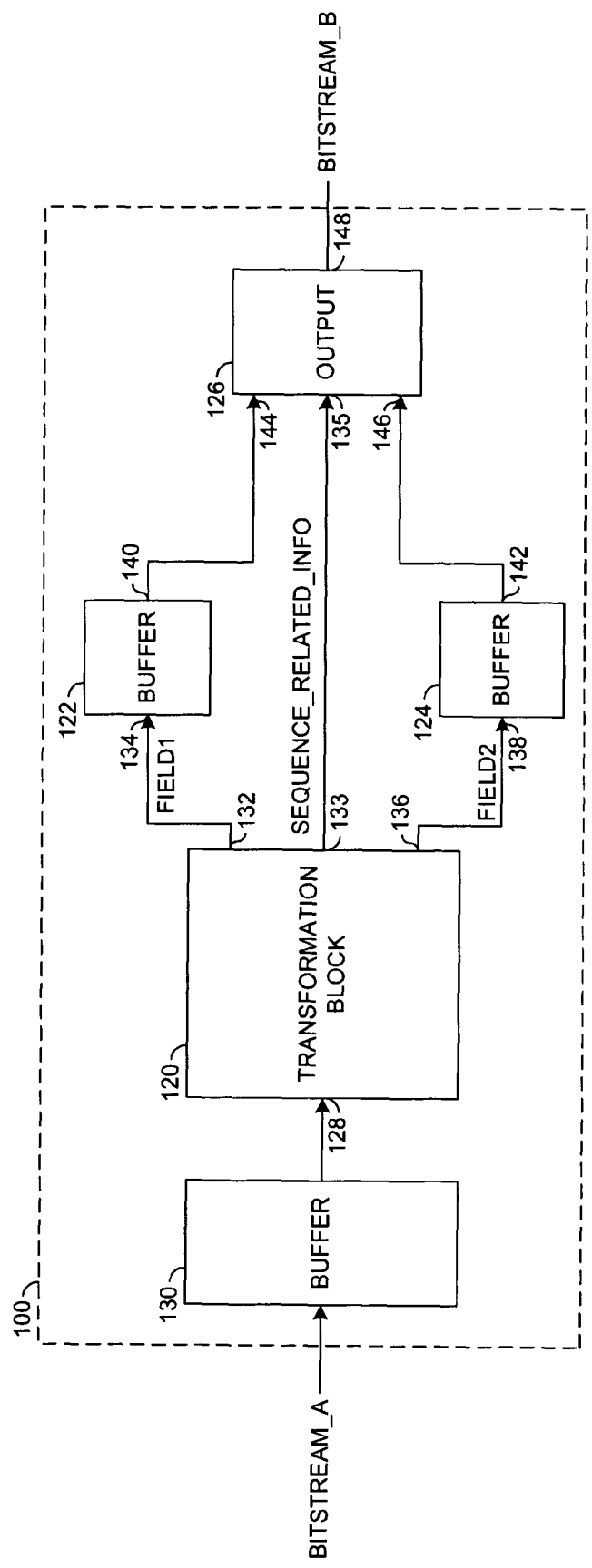
FIG. 3 is a block diagram illustrating a transformation block in accordance with a preferred embodiment of the present invention.

Referring to FIG. 3, a more detailed block diagram of the circuit 100 is shown. In one example, the circuit 100 may comprise a block (or circuit) 120, a buffer 122, a buffer 124 and a block (or circuit) 126. The circuit 120 may be implemented as a transformation block. The circuit 122 and 124 may be implemented as field buffers. In one example, the buffers 122 and 124 may be implemented as separate devices. Alternatively, the buffers 122 and 124 may be implemented as separate portions (or sections of a single memory device. The circuit 126 may be implemented as an output circuit.

The circuit 120 may have an input 128 that may receive the signal BITSTREAM_A. In one example, the signal BITSTREAM_A may be presented to the circuit 120 via a buffer 130. The circuit 120 may be configured to transform the signal BITSTREAM_A from an intra-only MPEG-2 frame picture to individual field data (e.g., a first and a second field picture). The circuit 120 may be further configured to copy sequence related information (e.g., SEQUENCE_RELATED_INFO) from a header of the signal BITSTREAM_A directly to the output signal BITSTREAM_B. The circuit 120 may have an output 132 that may present a signal (e.g., FIELD1) to an input 134 of the buffer 122, an output 133 that may present sequence related information to an input 135 of the output circuit 126 and an output 136 that may present a signal (e.g., FIELD2) to an input 138 of the buffer 124. The signal FIELD1 may comprise a first field header and a number of slices (or rows) containing data of a single field of a video frame. The signal FIELD2 may comprise a second field header and a number of slices comprising data of a second field of a video frame. An output 140 of the buffer 122 and an output 142 of the buffer 124 may be presented to inputs 144 and 146, respectively, of the output circuit 126. The output circuit 126 may be configured to present the sequence related information from the signal BITSTREAM_A, the contents of the buffer 122 and the contents of the buffer 124 consecutively at an output 148 as the signal BITSTREAM_B.

Figure 4:
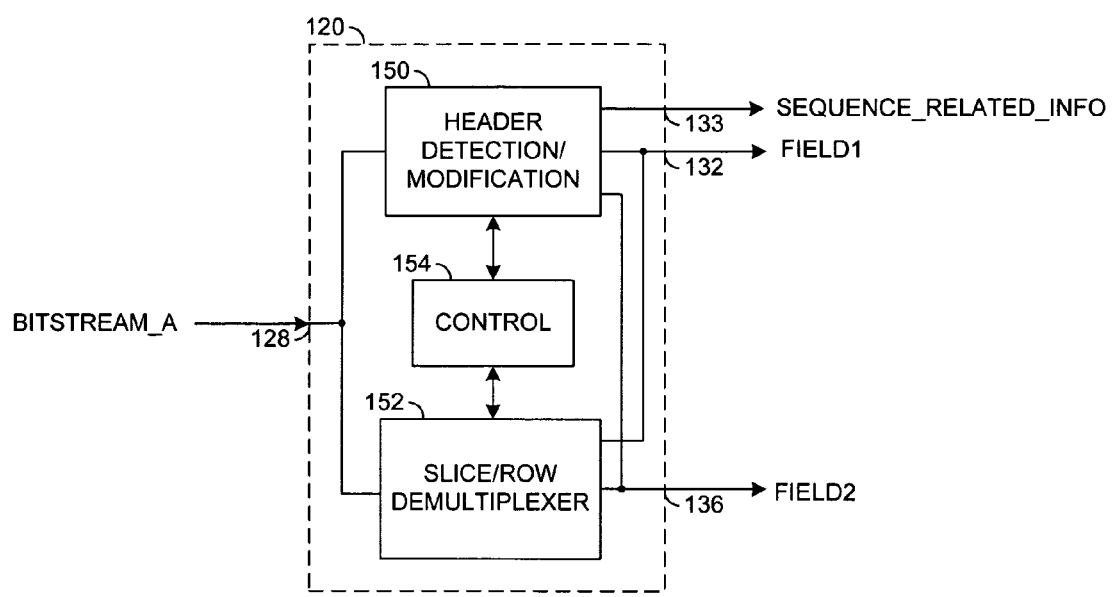
FIG. 4 is a more detailed block diagram of a transformation block in accordance with a preferred embodiment of the present invention.

Referring to FIG. 4, a more detailed block diagram of the circuit 120 is shown illustrating an example implementation. The circuit 120 may comprise, in one example, a circuit 150, a circuit 152 and a circuit 154. The circuit 150 may be implemented, in one example, as a header detection and modification circuit. The circuit 152 may be implemented, in one example, as a slice/row demultiplexer circuit (or block). The circuit 154 may be implemented, in one example, as a control circuit.

The signal BITSTREAM_A may be presented to an input of the circuit 150 and an input of the circuit 152. The circuit 150 may be configured to detect a frame header portion of the signal BITSTREAM_A. The header detection and modification circuit 150 may be configured to copy all sequence-related information from the signal BITSTREAM_A to the output 133. The sequence-related information is generally copied without modification. However, in an alternate embodiment, the circuit 150 may be configured to modify one or more portions of any sequence-related headers in the signal BITSTREAM_A prior to presentation at the output 133.

The circuit 150 may be configured to generate a first field header (e.g., an even field header) and a second field header (e.g., an odd field header) in response to the frame header of the signal BITSTREAM_A. The header detection and modification circuit 150 may be configured to present the first field header as part of the signal FIELD1 and the second field header as part of the signal FIELD2. The circuit 152 may be configured to demultiplex respective slices for the first field (e.g., field 1) and the second field (e.g., field 2) of the frame contained within signal BITSTREAM_A. For example, the circuit 152 may be configured to direct slices for the first field to the signal FIELD1 and slices for the second field to the signal FIELD2. The circuit 154 may be configured to control the circuits 150 and 152. For example, the circuit 154 may be configured to generate one or more control signals for coordinating operation of the circuits 150 and 152 with the signals BITSTREAM_A, FIELD1 and FIELD2.

Figure 5:
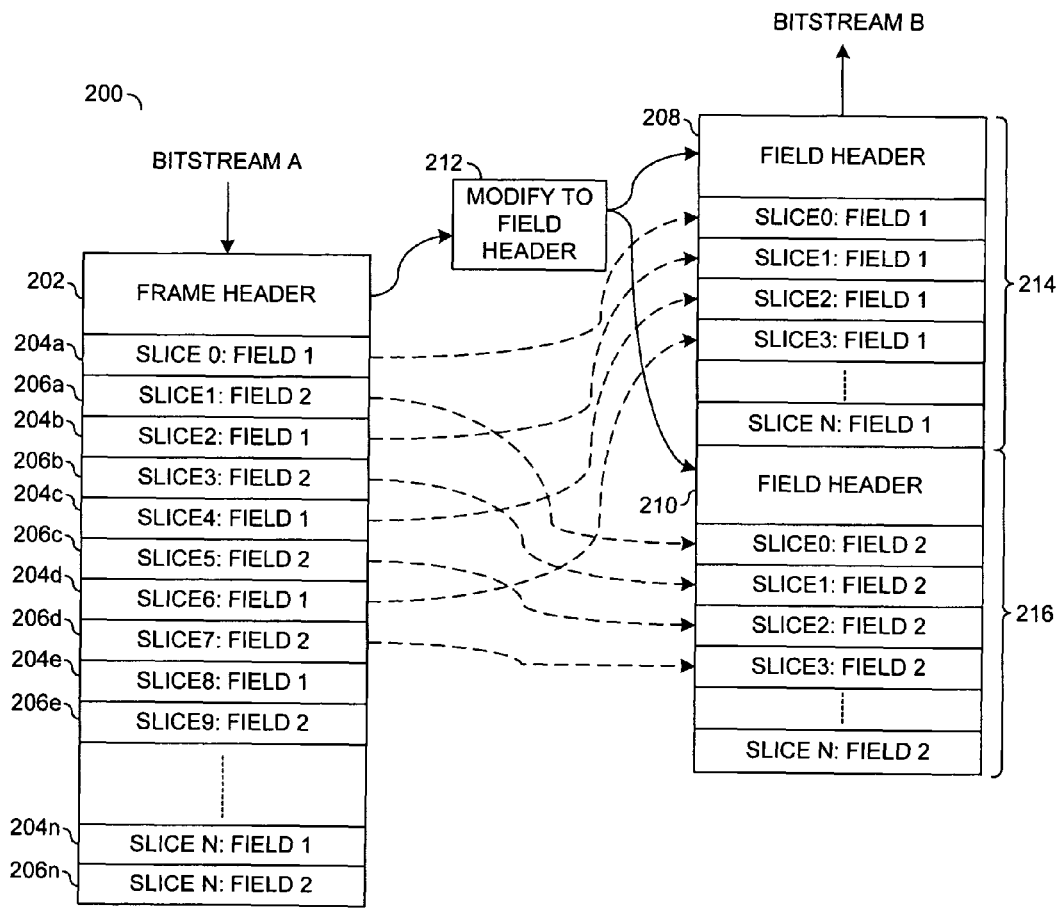
FIG. 5 is a flow diagram illustrating a data flow path in accordance with a preferred embodiment of the present invention.

Referring to FIG. 5, a flow diagram illustrating an example data flow path in accordance with a preferred embodiment of the present invention is shown. In one example, the signal BITSTREAM_A may comprise a frame header 202, a plurality of slices from a first field 204a-204n and a plurality of slices from a second field 206a-206n. The slices 204a-204n and 206a-206n generally alternate position (e.g., are time division multiplexed) in the signal BITSTREAM_A. The frame header 202 is generally modified to generate a first field header 208 and a second field header 210. A process 212 may be used to modify the frame header 202. In one example, the process 212 may involve copying information of the frame header 202 into each of the field headers 208 and 210 and modifying appropriate fields of the frame header 202 to signal the headers 208 and 210 as being field headers. The slices 204a-204n of field 1 are generally directed to a first field buffer 214. The slices 206a-206n of field 2 are generally directed to a second field buffer 216. The order of the field slices are maintained in the respective field buffers. For example, a picture coding extension field (or portion) of each of the field headers 208 and 210 may be modified from the frame header 202. The slices in each field buffer are generally modified to signal consecutive slice numbers. The field buffers 214 and 216 are generally presented consecutively as the signal BITSTREAM_B.

Figure 6:
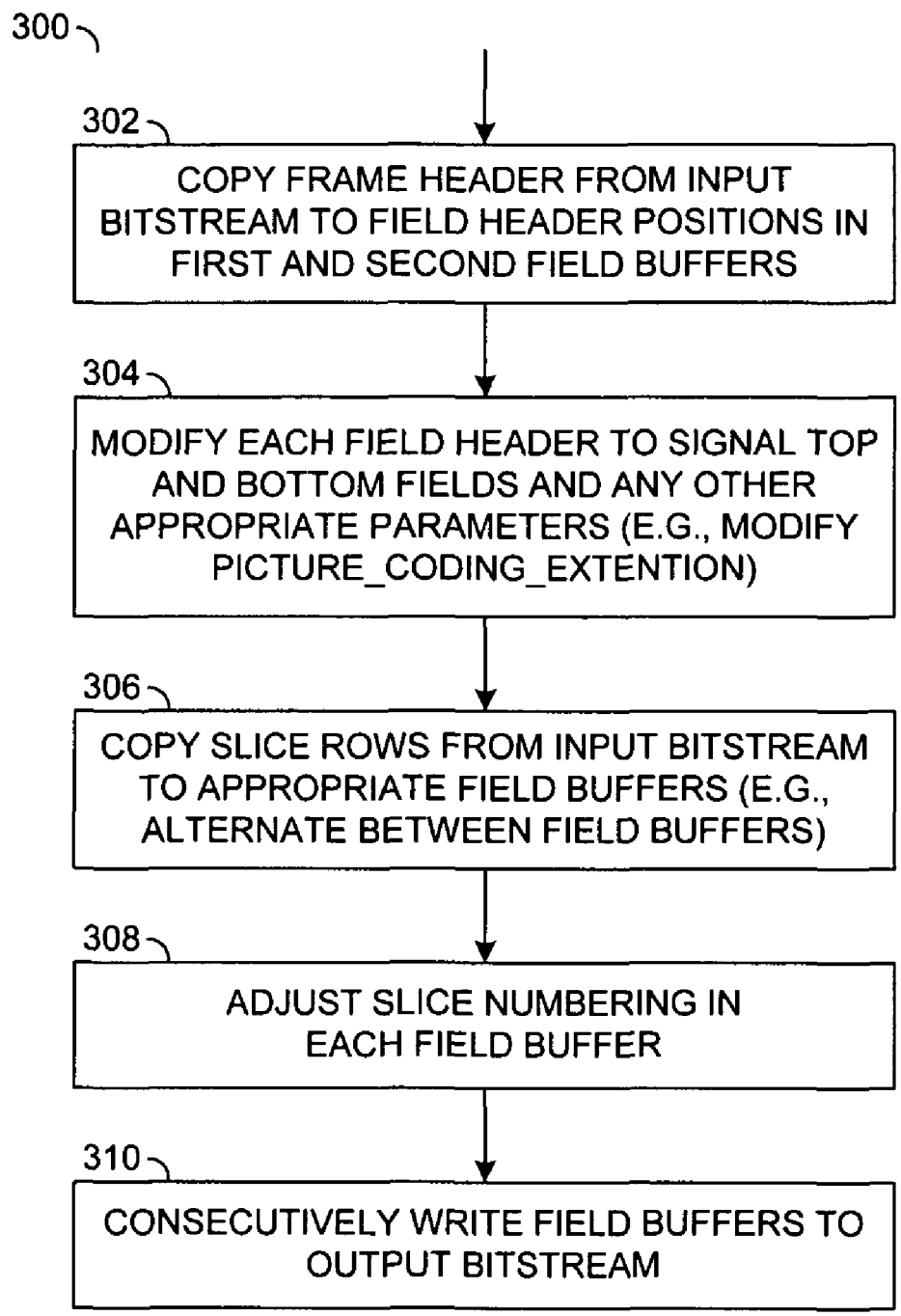
FIG. 6 is a flow diagram illustrating a transformation process in accordance with a preferred embodiment of the present invention.

Referring to FIG. 6, a flow diagram of a process 300 is shown illustrating a transformation process in accordance with a preferred embodiment of the present invention. A bitstream header portion of the signal BITSTREAM_A (e.g., from the start of the bitstream up to the first slice) is generally copied from the signal BITSTREAM_A into a first and a second field buffers (e.g., the block 302). A portion (or field) of the bitstream header (e.g., a picture_coding_extension field) is generally modified in each of the first and second field buffers to signal a top field picture and a bottom field picture, respectively. Other header parameters may be modified also in accordance with the transformation (e.g., the block 304). The slice rows from the signal BITSTREAM_A are generally de-multiplexed (e.g., alternating copied) to the appropriate field buffer (e.g., the block 306). A field indicative of the slice number for each slice in each field buffer is generally adjusted to increment consecutively in the respective field (e.g., the block 308). When the transformation is complete, the two field buffers are generally written out consecutively to the second signal BITSTREAM_B (e.g., the block 310).

The present invention may be implemented in software, hardware and/or a combination of hardware and software. The function performed by the flow diagrams of FIGS. 5 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of application specific integrated circuits (ASICs), application specific standard products (ASSPs), field programmable gate arrays (FPGAs), or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for decoding a bitstream comprising the steps of:
   (A) receiving a first encoded bitstream at an input of a pre-decoder, wherein said first encoded bitstream is an intra-only frame picture encoded bitstream comprising a frame header and alternating macroblock rows, with each macroblock row containing encoded data for a plurality of vertical lines from a single respective field of a frame picture encoded in said first encoded bitstream;
   (B) generating in said pre-decoder a first field header and a second field header using said frame header of said first encoded bitstream, wherein said first field header comprises a copy of said frame header modified to signal a first field picture and said second field header comprises a copy of said frame header modified to signal a second field picture;
   (C) storing said first field header and macroblock rows containing the encoded data for the plurality of vertical lines from a first field of the frame picture in a first buffer in said pre-decoder and storing said second field header and macroblock rows containing the encoded data for the plurality of vertical lines from a second field of the frame picture in a second buffer in said pre-decoder, wherein the encoded data for the plurality of vertical lines contained in each macroblock row in said first buffer and said second buffer is a copy of the encoded data for the plurality of vertical lines contained in a corresponding macroblock row in the first encoded bitstream; and
   (D) generating a second encoded bitstream using said pre-decoder, said second encoded bitstream comprising (i) said first field header, (ii) said macroblock rows containing the encoded data for the plurality of vertical lines from said first field of the frame picture, (iii) said second field header and (iv) said macroblock rows containing the encoded data for the plurality of vertical lines from said second field of the frame picture, wherein said second encoded bitstream is an intra-only field picture encoded bitstream; and
   (E) presenting said second encoded bitstream to an input of a standard, MPEG-2 compliant decoder, wherein said second encoded bitstream is decoded as two interlaced field pictures and the encoded data for the plurality of vertical lines contained in each macroblock row remains encoded from reception of said first encoded bitstream at said input of said pre-decoder through presentation of said second encoded bitstream to said input of said standard, MPEG-2 compliant decoder.

2. The method according to claim 1, wherein said generating steps further comprise:
   copying said frame header from said first encoded bitstream into a first field header portion of said first buffer to form said first field header and a second field header portion of said second buffer to form said second field header;
   modifying a portion of said first field header to indicate a top field picture; and
   modifying a portion of said second field header to indicate a bottom field picture.

3. The method according to claim 2, wherein said generating steps further comprise:
   copying a plurality of said macroblock rows from said first bitstream to said first buffer and said second buffer, wherein said copying alternates between said first and said second buffers after each macroblock row.

4. The method according to claim 3, wherein said generating steps further comprise:
   adjusting a slice number of each macroblock row in said first buffer; and
   adjusting a slice number of each macroblock row in said second buffer to increment consecutively.

5. The method according to claim 1, wherein step (D) further comprises:
   writing (i) said first field header, (ii) said macroblock rows containing the encoded data for the plurality of vertical lines from said first field of the frame picture, (iii) said second field header and (iv) said macroblock rows containing the encoded data for the plurality of vertical lines from said second field of the frame picture consecutively to said second encoded bitstream.

6. The method according to claim 4, wherein step (D) comprises:
   writing said first buffer followed by said second buffer to said second encoded bitstream.

7. The method according to claim 1, further comprising:
   decoding said second encoded bitstream into a first decoded field picture and a second decoded field picture; and
   presenting even field lines on a television monitor in response to said first decoded field picture and odd field lines on said television monitor in response to said second decoded field picture.

8. The method according to claim 1, wherein a picture coding extension portion of said first field header is modified to signal a top field and a picture coding extension portion of said second field header is modified to signal a bottom field.

9. An apparatus including a non-transitory computer readable medium storing instructions for performing a process comprising:

receiving a first encoded bitstream, wherein said first encoded bitstream is an intra-only frame picture encoded bitstream comprising a frame header and alternating macroblock rows, with each macroblock row containing encoded data for a plurality of vertical lines from a single respective field;

generating a first field header and a second field header using said frame header of said first encoded bitstream, wherein said first field header comprises a copy of said frame header modified to signal a first field picture and said second field header comprises a copy of said frame header modified to signal a second field picture;

storing said first field header and macroblock rows containing the encoded data for the plurality of vertical lines from a first field of the frame picture in a first buffer and storing said second field header and macroblock rows containing the encoded data for the plurality of vertical lines from a second field of the frame picture in a second buffer, wherein the encoded data for the plurality of vertical lines contained in each macroblock row in said first buffer and said second buffer is a copy of the encoded data for the plurality of vertical lines contained in a corresponding macroblock row in the first encoded bitstream; and generating a second encoded bitstream comprising (i) said first field header, (ii) said macroblock rows containing the encoded data for the plurality of vertical lines from said first field of the frame picture, (iii) said second field header and (iv) said macroblock rows containing the encoded data for the plurality of vertical lines from said second field of the frame picture, wherein said second encoded bitstream is an intra-only field picture encoded bitstream; and decoding said second encoded bitstream as two interlaced field pictures comprising a standard, MPEG-2 compliant decoder, wherein the encoded data for the plurality of vertical lines contained in each macroblock row remains encoded from reception by said receiving means through presentation to said decoding means.

10. An apparatus comprising:
a first circuit configured to
  (i) receive a first encoded bitstream, wherein said first encoded bitstream is an intra-only frame picture encoded bitstream comprising a frame header and alternating macroblock rows, with each macroblock row containing encoded data for a plurality of vertical lines from a single respective field,
  (ii) generate a first field header and a second field header using said frame header of said first encoded bitstream, wherein said first field header comprises a copy of said frame header modified to signal a first field picture and said second field header comprises a copy of said frame header modified to signal a second field picture;
  (iii) store said first field header and macroblock rows containing the encoded data for the plurality of vertical lines from a first field of the frame picture in a first buffer and store said second field header and macroblock rows containing the encoded data for the plurality of vertical lines from a second field of the frame picture in a second buffer, wherein the encoded data for the plurality of vertical lines contained in each macroblock row in the first buffer and the second buffer is a copy of the encoded data for the plurality of vertical lines contained in a corresponding macroblock row in the first encoded bitstream, and
  (iv) generate a second encoded bitstream comprising (a) said first field header, (b) said macroblock rows containing the encoded data for the plurality of vertical lines from said first field of the frame picture, (c) said second field header and (d) said macroblock rows containing the encoded data for the plurality of vertical lines from said second field of the frame picture, wherein said second encoded bitstream is an intra-only field picture encoded bitstream; and a second circuit configured to decode said second encoded bitstream as two interlaced field pictures, wherein said second circuit comprises a standard, MPEG-2 compliant decoder and the encoded data for the plurality of vertical lines contained in each macroblock row remains encoded from reception by said first circuit through presentation to said second circuit.

11. The apparatus according to claim 10, wherein said first circuit comprises:
one or more memory devices containing said first buffer and said second buffer;
an output circuit coupled to said one or more memory devices and generating said second encoded bitstream; and
a transform circuit coupled to said one or more memory devices and said output circuit, and configured to (i) copy said frame header from said first encoded bitstream into a first field header portion of said first buffer to form said first field header and a second field header portion of said second buffer to form said second field header.

12. The apparatus according to claim 11, wherein said transform circuit is further configured to:
modify (i) a portion of said first field header to indicate a top field picture and (ii) a portion of said second field header to indicate a bottom field picture.

13. The apparatus according to claim 11, wherein said transform circuit is further configured to:
copy a plurality of said macroblock rows from said first encoded bitstream to said first buffer and said second buffer, wherein said copying alternates between said first buffer and said second buffer after each macroblock row is copied.

14. The apparatus according to claim 13, wherein said transform circuit is further configured to:
adjust a slice number of each macroblock row in said first buffer to increment consecutively and adjust a slice number of each macroblock row in said second buffer to increment consecutively.

15. The apparatus according to claim 11, wherein said transform circuit is further configured to:
write the contents of said first buffer and the contents of said second buffer consecutively to said second encoded bitstream.

16. The apparatus according to claim 10, wherein said second circuit is further configured to:
decode said second encoded bitstream into a first decoded field picture and a second decoded field picture; and
present even field lines on a television monitor in response to said first decoded field picture and odd field lines on said television monitor in response to said second decoded field picture.

17. The apparatus according to claim 10, wherein said first encoded bitstream is an intra-only MPEG-2 frame picture stream and said second encoded bitstream is an intra-only MPEG-2 field picture stream.

18. The apparatus according to claim 15, wherein said transform circuit is further configured to:

write sequence-related information from said first encoded bitstream directly to said second encoded bitstream.

19. The apparatus according to claim 18, wherein said transform circuit modifies one or more portions of sequence-related headers from said first encoded bitstream prior to output in said second encoded bitstream.

* * * * *